United States Patent Office 3,488,466
Patented Jan. 6, 1970

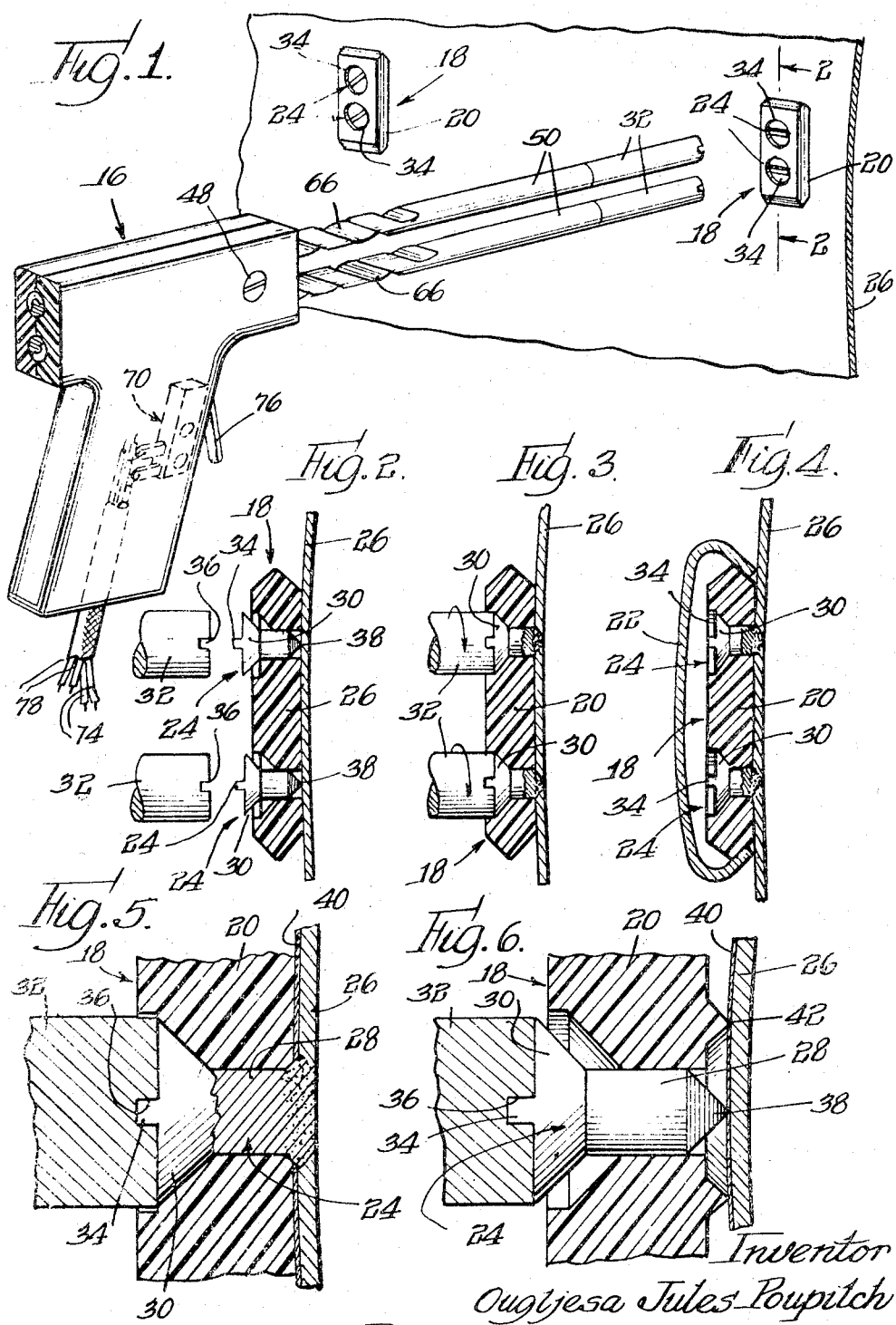

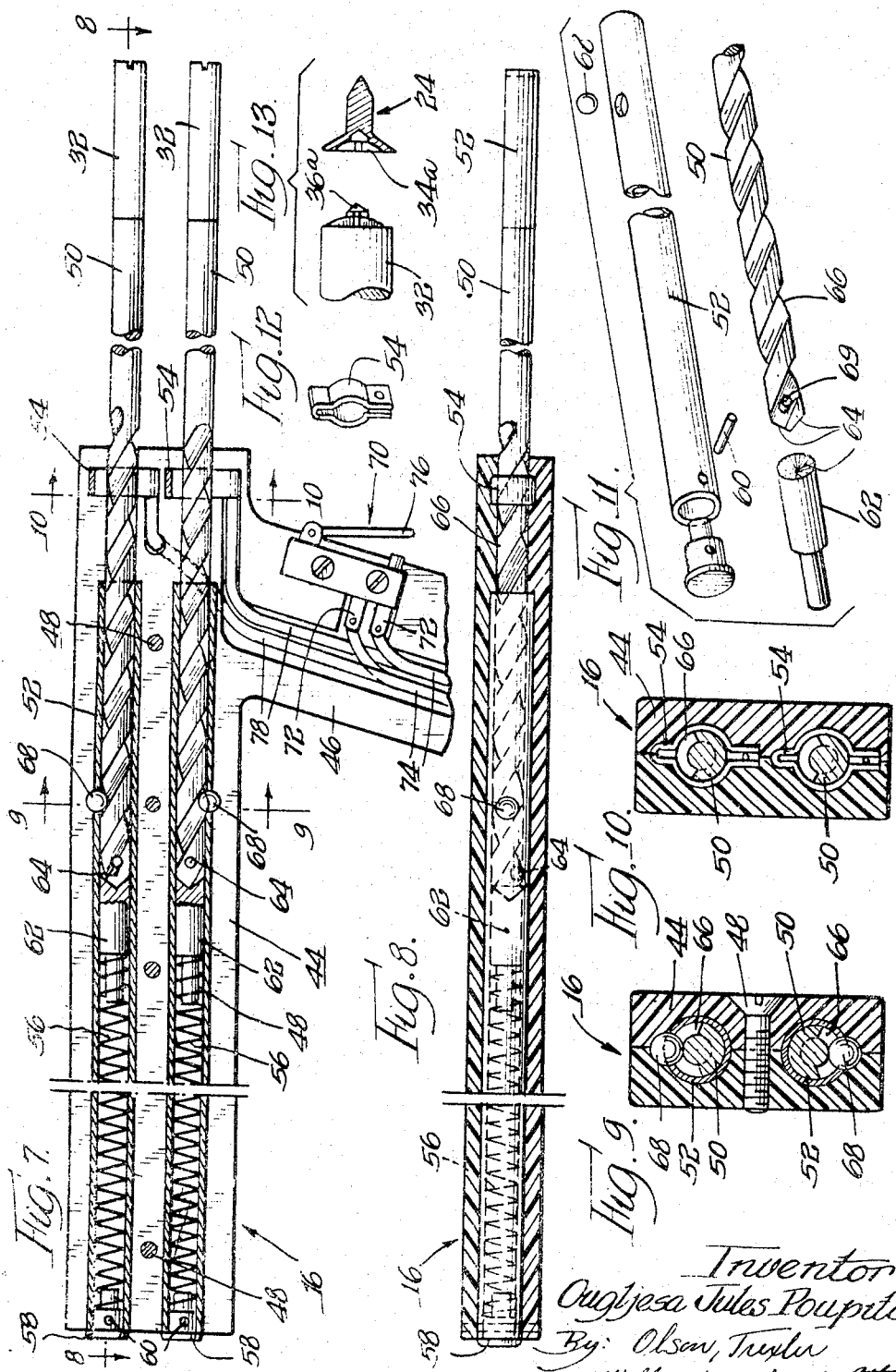

3,488,466
METHOD AND APPARATUS FOR WELDING RIVET TYPE METALLIC FASTENERS
Ougljesa Jules Poupitch, Itasca, Ill., assignor to Illinois Tool Works Inc., Chicago, Ill., a corporation of Delaware
Original application Oct. 7, 1965, Ser. No. 493,761, now Patent No. 3,426,394, dated Feb. 11, 1969. Divided and this application July 1, 1968, Ser. No. 741,794
Int. Cl. B23k 9/24
U.S. Cl. 219—99
8 Claims

ABSTRACT OF THE DISCLOSURE

There is disclosed a method and apparatus for subjecting a plurality of spaced weldable rivets to rotation for axial pressures followed by the passage of a welding current through the rivets and the workpiece with which they are in contact for welding the rivet to the workpiece.

---

This application is a division of my copending application Ser. No. 493,761, now Patent No. 3,426,394, filed Oct. 7, 1965.

This invention relates generally to improvements in fasteners of a type known as molding clips and to the art of applying such fasteners to metallic surfaces, and more particularly to improvements in molding clips of the type adapted for securing molding strips or trim to automobile bodies as well as to improved means and methods of applying such strips to sheet metal automobile bodies.

It has been common practice in the automotive industry to apply molding strips such as chromium plated decorative strips of metallic stock by springing these strips in position over previously applied molding clips. Most molding trim is generally U-shaped in cross-section, thus enabling the margins of the molding strip to be sprung over clips which have been previously secured in predetermined spaced relation along the outer surface of the automobile body. Molding clips now in common use by the automotive industry are designed for insertion within the preformed apertures. Obviously such clip accommodating apertures must be formed in the sheet metal body stock prior to the application of coating material, such as paint. To do otherwise would cause unsightly cracks and impairments to appear in the surface of the body stock. It is not uncommon, during the painting operation, for the edges which define the apertures to remain unpainted. As a result, corrosion is often developed along these edges. The preformed perforations or apertures for accommodating the molding clips must be located along the body stock with considerable precision. Hence substantial engineering layout work must be done prior to the actual stamping of the aligned apertures.

In view of the foregoing, it should be apparent that if the work involved in preforming clip accommodating apertures could be avoided, it would result in considerable savings in manufacturing cost. It is, therefore one of the important objects of the present invention to provide novel and extremely practical means and methods of applying molding clips efficiently and securely to an automobile body without the use of preformed apertures.

It is also an important object of the present invention to make possible the application of molding clips directly to the coated or painted surface of the sheet metal stock without first having apertures formed in the stock to accommodate the clips.

More specifically, the invention contemplates the provision of novel equipment or apparatus whereby novel methods of welding may be practiced to secure molding clips to metallic stock. To this end it is proposed to apply the clip directly to the coated or painted surface of the stock contemporaneously with the step of welding of a portion of the clip to the stock.

It is also an object of this invention to provide apparatus for and methods of welding clips to the sheet metal surfaces referred to above in such a manner as to localize the heat conditions developed during the welding operation and thereby prevent undesirable scorching or cracking of the painted surface area in the vicinity of the clip.

The foregoing and other objects and advantages will be more apparent from the following detailed description when considered in connection with the accompanying drawings, wherein:

FIG. 1 is a perspective view illustrating a welding tool of the present invention in association with a fragmentary section of metallic stock to which molding clips previously have been welded;

FIG. 2 is a vertical sectional view taken substantially along the line 2—2 of FIG. 1, disclosing a molding clip having associated therewith a pair of rotary welding rivets or fastener members in readiness to be welded to the sheet metal stock;

FIG. 3 is a view similar to FIG. 2 showing the welding electrodes acting upon the rotary welding rivets so as to cause said rivets to be welded to the sheet metal stock;

FIG. 4 is a view similar to FIG. 3 showing the manner in which a molding strip of substantially U-shaped cross-section may be sprung over the margins of the above-mentioned molding clip;

FIG. 5 is an enlarged sectional view similar to the view shown in FIG. 3, illustrating the manner in which the metallic welding rivet is secured by a weld to the sheet metal stock;

FIG. 6 is an enlarged fragmentary sectional view similar to the upper portion of FIG. 2, the side of the non-conductive body portion being modified so as to provide a work-engaging projecting annulus surrounding the work-engaging extremity of the welding rivet;

FIG. 7 is a side view of the manually manipulable welding tool with the front half of the housing removed so as to expose more clearly the internal mechanism of the tool;

FIG. 8 is a horizontal longitudinal sectional view of the welding tool taken substantially along the line 8—8 of FIG. 7;

FIG. 9 is a vertical transverse sectional view of the welding tool taken substantially along the line 9—9 of FIG. 7;

FIG. 10 is a transverse sectional view taken substantially along the line 10—10 of FIG. 7;

FIG. 11 is an exploded view of the various elements which comprise the mechanism for imparting rotation to the welding electrodes;

FIG. 12 is a perspective view of one of the spring bearings in which the reciprocable and rotatable welding rods operate; and FIG. 13 discloses fragmentarily, in elevation, the driving extremity of one of the welding tool electrodes in association with a welding rivet adapted to be rotated thereby, said welding rivet being shown in longitudinal section.

Referring now to the drawings more in detail, wherein like numerals have been employed to designate similar parts throughout the various figures, it will be seen that a welding tool which is representative of one embodiment of the present invention, is designated generally by the numeral 16 (see FIGS. 1, 7 and 8). Molding clips of the type contemplated by the present invention are designated generally by the numeral 18. Each of the clips 18 includes a body portion 20 formed of electrically non-conductive material, such as suitable plastic material. The upper and lower margins of the body 20 are chamfered so as to permit a molding strip 22 (FIG. 4) of generally U-shaped cross-section, to be snapped over these margins. Each of the clip bodies 20 is apertured to accommodate metallic welding rivets or fasteners 24. These rivet-like fasteners 24 are adapted to be welded to the surface of a metallic workpiece 26 such as an automobile body, as will hereinafter be described.

The fasteners 24 include a shank portion 28 and a head 30. The heads 30 are adapted to be coupled with the free extremity of a rotary driving electrode 32 of the previously mentioned welding tool 16. In the disclosed embodiment the head 30 of the fastener rivets 24 are provided with transverse lugs 34 which are adapted to cooperate with complementary like recesses 36 traversing the free extremity of the electrodes 32. Modified coupling means are contemplated by the present invention, such as a slot in the rivet head and a complementary lug on the electrode. Likewise, it is contemplated that the free extremity of the electrode 32 may be provided with a Phillips head or similar type of driving tool cooperating with a complementary recess in the rivet head. It is preferable to have the shank portions 28 of the rivet fasteners 24 preassembled with the body 20 so that the clip 18 may be handled as a single unit. Thus the rivet member may be frictionally secured against unauthorized separation from the clip body. Attention is directed to the extremity of the fasteners 24 oppositely disposed from the heads 30. This opposite extremity is provided with a surface scraping edge 38. The purpose of the edge 38 is to cause any surface paint or coating on the workpiece 26 to be removed prior to the passage of welding current through the fasteners and the workpiece 26. In the enlarged sectional view shown in FIGS. 5 and 6, a coating of paint is designated by the numeral 40.

Before presenting a detailed description of the structure of the tool 16, which is used to apply welding current to the rivet-type fasteners 24, reference will first be made to the general method of applying the molding clips 18 to a work surface. With a clip located in a predetermined desired position on the painted surface of the workpiece 26, the electrodes 32 are moved into coupling association with the heads 30 of the rivet fasteners 24.

Rotation of the scraping edge 38 against the coated surface 40 of the workpiece 26 causes a firm metal to metal contact to be established between the rivet and the work surface. At this instant, through the agency of the welding tool 16, later to be described, a welding circuit is closed which includes the electrodes 32, the rivets 24 and the workpiece 26. Thus the entering extremities of the rivets 24 are welded firmly to the sheet metal workpiece 26 as shown clearly in FIGS. 3–5, inclusive. The clip body 20 of non-conductive material, is now firmly held against the surface of the sheet metal workpiece 26. The welding operation is completed without seriously scorching or cracking the coating 40 in the immediate vicinity of the welding rivets 24. Any slight discoloration which might take place is adequately concealed by the clip body 20. In FIG. 6 a slightly modified clip body is shown. The clip body 20 of FIG. 6 is provided with an annular protuberance 42, and this protuberance assists in localizing the lateral extent of the welded area. Any flow of material heated in the vicinity will be confined within the limits provided by said annular protuberance.

The tool 16 includes an elongated housing portion 44 which is supported at the upper extremity of a handle portion 46. The elongated housing 44 and the handle 46 are formed of suitable non-conductive material which present two half-sections held together by screw members 48, FIGS. 7 and 9. The electrodes 32 previously referred to are carried at the outer extremity of actuating rods which are both rotatable and longitudinally reciprocable. The inner extremities of the actuating rods 50 are reciprocable and rotatable within guide sleeves 52 secured against rotation within the housing 44. Sheet metal bushing members 54 at the forward extremity of the housing 44 also contact the guide rods 50. These bushing members 54 serve as connectors to electrically couple the rods with a conventional welding timer, not shown. Coil springs 56 interposed between the inner extremity of each of the rods 50 and outer plug abutment 58 constantly urge their respective rods 50 and the electrodes 32 supported thereby in an outward direction, namely to the right as shown in FIGS. 1 and 7. The abutments 58 may be secured against outward displacement at the extremity of the guide sleeve 52 by pins 60, shown in FIGS. 7 and 11. Interposed between the inner end of each of the rods 50 and adjacent extremity of their respective coil springs 56 is an abutment or coupling member 62. These members 62 are adapted to be coupled for rotation with their complementary actuating rods 50 by interengaging teeth 64. The spring 56 constantly urges said teeth 64 into interlocking association. It will be noted also that each of the guide rods 50 is provided with a helical groove 66 which cooperates with a complementary ball 68 trapped within the sleeve 52 as clearly shown in FIG. 7. Thus as the rods 50 experience longitudinal movement within their respective sleeves 52, rotation will also be imparted to these rods. A stop pin 69 on each rod 50 is adapted to engage a complementary ball 68 when the rod is fully extended.

A suitable fast-operating switch device 70, such as a LICON switch, is mounted within the handle 46. Terminals 72 of this switch device are electrically coupled by conductors 74 with the previously mentioned welding timer (not shown). When a trigger member 76 of the switch mechanism 70 is shifted to the left as viewed in FIG. 7, the above-mentioned welding timer is actuated, thereby closing a circuit which includes conductors 78 connected with the aforesaid connector members 54.

From the foregoing description, it should be clear that as the electrodes 32 of the tool 16 are moved into operative association with the heads 30 of the welding rivets 24, the actuating rods 50 are forced to the left (FIGS. 1 and 7) within their respective sleeves 52 against the action of the springs 56. The engagement of the balls 68 within the helical grooves 66 imparts rotation to the rods 50 and their supported electrodes 32. This rotation is imparted simultaneously to each of the welding rivet members 24, causing the scraping edges 38 to remove the paint material or coating 40 sufficiently to establish a good metal contact between the rivet and the surface of the metallic workpiece 26. The trigger 76 is now actuated to close the welding circuit which, as previously mentioned, includes the rivets 24 and the portion of the sheet metal workpiece extending therebetween.

The coupling between the electrodes 32 and the rivets 24 may vary structurally. In FIG. 13, a modified form of coupling or drive between the electrode and the rivet is shown. In this form the rivet is provided with a recess in the form of a cross-slot 34a and the driving extremity of the electrode 32 is formed with a complementary cross-blade 36a.

It is contemplated that the welding rivets may be imbedded within the plastic clip body 20 at the time of molding, so as to present a single unit for convenient handling. Also in some instances it may be advantageous to have the welding extremities of the rivets projecting axially beyond the side of the plastic clip which faces the work surfaces with the rivet head completely seated. In other words, the projecting extremities of the rivets would engage the work surface initially with the plastic spaced from said surface. During the welding cycle the clip would be moved under pressure into juxtaposition with the work surface as the weldable point of the rivet becomes dissipated. In instances where the plastic clip is relatively thin, the method of clip application just described is of very practical significance.

It will also be apparent that means other than the helical grooves in the guide rod may be employed to impart rotation to the welding rivets. The guide rods could be power driven for rotation.

It will be understood from the foregoing that the present invention contemplates a new and improved molding clip of simple and economical construction. The above described welding rivets adapted to be rotated so as to scrape away coatings from the sheet metal surface are also structurally unique. The aforementioned new and improved method of applying clips to sheet metal workpieces such as automobile bodies may be practiced efficiently by the use of the above described novel tool.

The present invention is not only applicable to the association of clips with automobile bodies, but may be used generally in instances where objects such as clips are to be applied to sheet metal stock. In other words, the invention has a very practical application in the manufacture of household utilities such as refrigerators and the like, wherein sheet metal is used.

While for purposes of illustration the invention has been described by reference to certain structural embodiments, it should be understood that the invention contemplates other modifications and changes and should only be limited by the appended claims.

The invention is claimed as follows:

1. An apparatus for resistance welding a plurality of rivet type metallic fasteners to a surface of a metallic workpiece including support means, a plurality of laterally spaced substantially parallel actuating members axially shiftably carried by said support means, means between said actuating members and said support means for rotating said actuating members and response to relative axial movement between the actuating members and said support means, electrodes respectively carried by and movable with said actuating members and including means drivingly engageable with said fasteners, and means including separate conductors for electrically connecting said electrodes in series with a welding circuit for causing welding current to pass from one fastener to another fastener through an area of the workpiece between said fasteners for substantially limiting heating of the workpiece during a welding operation to said area.

2. An apparatus, as defined in claim 1, which includes spring means between said support means and said actuating members for urging the actuating members axially in one direction with respect to said support means and for resisting forces tending to move said actuating members in the opposite direction relative to said support means when the support means is actuated for pressing the electrodes against the fasteners.

3. An apparatus, according to claim 1, wherein said support means comprises a manually holdable housing including handle means.

4. An apparatus, as defined in claim 1, wherein said support means comprises housing means, tubular elements mounted in said housing means and slidably and rotatably receiving said actuating members, and spring means mounted in said tubular elements and engaging said actuating members for biasing the actuating members axially outwardly with respect to said housing means.

5. An apparatus, as defined in claim 4, wherein each of said actuating members includes a portion having helical groove means disposed in an associated tubular element, and said means for rotating the actuating members comprises elements fixed with respect to and projecting within said tubular elements and engaging within said groove means.

6. An apparatus, as defined in claim 4, wherein said actuating members are formed from electricity conducting material and are electrically connected with said electrodes, and said means for electrically connecting the electrodes with a welding circuit comprises electrical contact members mounted in said housing means and engaging said actuating members, and said electrical conductors respectively being connected with said contact means and extending for connection with the welding circuit.

7. An apparatus, as defined in claim 6, wherein said housing means comprises a handle portion adapted to be gripped by the hand of an operator, and said means for electrically connecting the electrodes with a welding circuit comprises finger operable switch means mounted on said handle portion and connectable with energizing means of the welding circuit.

8. A method for resistance welding rivet type metallic fasteners to a metallic work surface comprising supporting a plurality of said metallic fasteners by a common electrical insulating member in adjacent substantially parallel relationship and for axial and rotative movement relative to the work surface, simultaneously pressing said fasteners against said surface and rotating the fasteners against said surface, and then simultaneously applying welding current in series through said adjacent fasteners and the area workpiece therebetween while maintaining axial pressure against said fastener and thereby securing the fasteners to the work surface and substantially limiting heating of the workpiece to said area.

References Cited

UNITED STATES PATENTS

| | | | |
|---|---|---|---|
| 2,432,750 | 12/1947 | Goldsworthy | 219—86 |
| 2,847,556 | 8/1958 | Brennen et al. | |
| 3,051,826 | 8/1962 | Avila | 219—128 |
| 1,995,001 | 3/1935 | Ito | 219—98 |
| 2,442,449 | 6/1948 | Zimmerman | 219—98 |
| 2,816,210 | 12/1957 | Mowry | 219—98 |
| 3,233,073 | 2/1966 | Ruetschi | 219—93 |
| 3,340,379 | 9/1967 | Sweeney | 219—107 X |

JOSEPH V. TRUHE, Primary Examiner

MARTIN C. FLIESLER, Assistant Examiner

U.S. Cl. X.R.

219—98